(12) United States Patent
Hiremath et al.

(10) Patent No.: US 11,436,632 B2
(45) Date of Patent: Sep. 6, 2022

(54) SYSTEMS AND METHODS FOR MACHINE LEARNING-BASED PREDICTIVE ORDER GENERATION

(71) Applicant: Verizon Patent and Licensing Inc., Arlington, VA (US)

(72) Inventors: Shashidhar Hiremath, Skillman, NJ (US); Rohani Raina Jotshi, Parsippany, NJ (US); Abigail T. Castaneda, South Amboy, NJ (US); Krishnendu Karmohan, Parlin, NJ (US); Pinaki Biswas, Piscataway, NJ (US); Amit Singh, Basking Ridge, NJ (US); Dustin Humphreys, Chester, NJ (US); Neeraj Garg, Flower Mound, TX (US); Sripriya Kannan, Irvine, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 335 days.

(21) Appl. No.: 16/297,404

(22) Filed: Mar. 8, 2019

(65) Prior Publication Data
US 2020/0286124 A1   Sep. 10, 2020

(51) Int. Cl.
| G06Q 30/00 | (2012.01) |
| G06Q 30/02 | (2012.01) |
| G06Q 30/06 | (2012.01) |
| G06N 20/00 | (2019.01) |
| G06N 5/04  | (2006.01) |

(52) U.S. Cl.
CPC ......... *G06Q 30/0254* (2013.01); *G06N 5/048* (2013.01); *G06N 20/00* (2019.01); *G06Q 30/0641* (2013.01)

(58) Field of Classification Search
None
See application file for complete search history.

(56) References Cited

U.S. PATENT DOCUMENTS

| 8,326,690 | B2* | 12/2012 | Dicker | G06Q 30/0631 |
| | | | | 705/26.7 |
| 8,438,052 | B1* | 5/2013 | Chanda | G06Q 30/0207 |
| | | | | 705/7.11 |
| 8,484,099 | B1* | 7/2013 | Pope | G06Q 30/0278 |
| | | | | 705/26.7 |
| 8,635,537 | B1* | 1/2014 | Kan | G06Q 30/0601 |
| | | | | 715/764 |
| 9,189,811 | B1* | 11/2015 | Bhosle | G06Q 30/06 |
| 9,430,796 | B1* | 8/2016 | So | G06Q 30/0633 |
| 9,619,831 | B1* | 4/2017 | Kumar | G06Q 20/20 |
| 9,641,870 | B1* | 5/2017 | Cormie | G06Q 30/0261 |
| 10,019,747 | B2* | 7/2018 | Hu | G06Q 10/087 |
| 10,223,731 | B1* | 3/2019 | Johnson | G06Q 30/0253 |
| 10,410,272 | B1* | 9/2019 | Johnson | G06Q 30/0204 |

(Continued)

*Primary Examiner* — Luis A Brown (57) ABSTRACT

A system described herein may use automated techniques, such as machine learning techniques, to identify products that a user may be interested in purchasing. For example, a model may be created for a user, and attributes of products available for sale may be compared to the model. When determining that a user may be interested in a particular product, a graphical user interface ("GUI") may be prepopulated and presented to a device of the user, to facilitate the user purchasing the product with minimal interaction.

18 Claims, 7 Drawing Sheets

(56) References Cited

U.S. PATENT DOCUMENTS

| | | | |
|---|---|---|---|
| 10,529,008 B1* | 1/2020 | Pritchard | G06Q 30/0641 |
| 10,599,449 B1* | 3/2020 | Chatzipanagiotis | G06N 3/04 |
| 10,636,074 B1* | 4/2020 | Bentley | G06F 3/041 |
| 10,643,246 B1* | 5/2020 | Suprasadachandran Pillai | G06Q 30/0269 |
| 10,726,334 B1* | 7/2020 | Elnahrawy | G06N 3/0454 |
| 10,891,678 B1* | 1/2021 | Muralidharan | G06F 7/026 |
| 10,902,341 B1* | 1/2021 | Qureshi | G06Q 10/10 |
| 10,907,983 B1* | 2/2021 | Singh | G08G 1/09685 |
| 10,909,569 B1* | 2/2021 | Shah | G06N 5/022 |
| 10,922,742 B2* | 2/2021 | Adel | G06Q 20/32 |
| 10,970,629 B1* | 4/2021 | Dirac | G06N 7/005 |
| 10,991,028 B1* | 4/2021 | Aubrey | G06Q 30/0631 |
| 10,997,500 B1* | 5/2021 | Vishnu Narayanan | G06N 5/04 |
| 11,062,337 B1* | 7/2021 | Ross | G06Q 30/02 |
| 11,205,188 B1* | 12/2021 | Engle | G06Q 30/0222 |
| 2008/0033832 A1* | 2/2008 | Ho | H04M 1/72445 705/26.1 |
| 2012/0036037 A1* | 2/2012 | Xiao | G06Q 30/00 705/26.7 |
| 2012/0265587 A1* | 10/2012 | Kinkead | G06Q 30/02 705/14.1 |
| 2012/0290377 A1* | 11/2012 | Itani | G06Q 30/0603 705/26.7 |
| 2013/0339137 A1* | 12/2013 | Lempel | G06Q 30/02 705/14.49 |
| 2014/0067570 A1* | 3/2014 | Sengupta | G06Q 20/3276 705/21 |
| 2014/0180861 A1* | 6/2014 | Basavaiah | G06Q 30/0605 705/26.2 |
| 2015/0073907 A1* | 3/2015 | Purves | G06Q 30/0207 705/14.58 |
| 2015/0332414 A1* | 11/2015 | Unser | G06F 16/285 705/30 |
| 2015/0339759 A1* | 11/2015 | Pope | G06Q 30/0631 705/26.62 |
| 2016/0109954 A1* | 4/2016 | Harris | H04L 63/0861 345/156 |
| 2017/0053208 A1* | 2/2017 | Krishnamurthy | G06Q 30/0241 |
| 2017/0068993 A1* | 3/2017 | Kim | G06F 16/9535 |
| 2018/0047083 A1* | 2/2018 | Agarwal | G06Q 30/0641 |
| 2018/0150883 A1* | 5/2018 | Davin | G06Q 30/0269 |
| 2018/0189859 A1* | 7/2018 | Campos | H04L 63/0815 |
| 2018/0211333 A1* | 7/2018 | Lackman | G06N 20/00 |
| 2018/0232795 A1* | 8/2018 | Goulart | G06Q 30/0255 |
| 2018/0260840 A1* | 9/2018 | Jeon | G06Q 30/0246 |
| 2019/0005575 A1* | 1/2019 | Zeldin | G06Q 30/0613 |
| 2019/0130471 A1* | 5/2019 | DePizzol | G06Q 30/0627 |
| 2019/0147454 A1* | 5/2019 | Millington | G06Q 30/0635 705/26.5 |
| 2019/0173919 A1* | 6/2019 | Irimie | H04L 67/22 |
| 2019/0236488 A1* | 8/2019 | Achan | H04L 67/26 |
| 2019/0347689 A1* | 11/2019 | Bullock | G06Q 30/00 |
| 2020/0027102 A1* | 1/2020 | Xu | G06Q 30/0202 |
| 2020/0034915 A1* | 1/2020 | Paisley | H04W 4/021 |
| 2020/0286124 A1* | 9/2020 | Hiremath | G06N 20/00 |

* cited by examiner

SYSTEMS AND METHODS FOR MACHINE LEARNING-BASED PREDICTIVE ORDER GENERATION

BACKGROUND

Products and/or services may typically be available through various commercial channels, such as online or brick-and-mortar stores. Potential users may not always be aware of products that are available and/or that may be of interest to them.

DETAILED DESCRIPTION OF THE PREFERRED EMBODIMENTS

The following detailed description refers to the accompanying drawings. The same reference numbers in different drawings may identify the same or similar elements.

Figure 1:
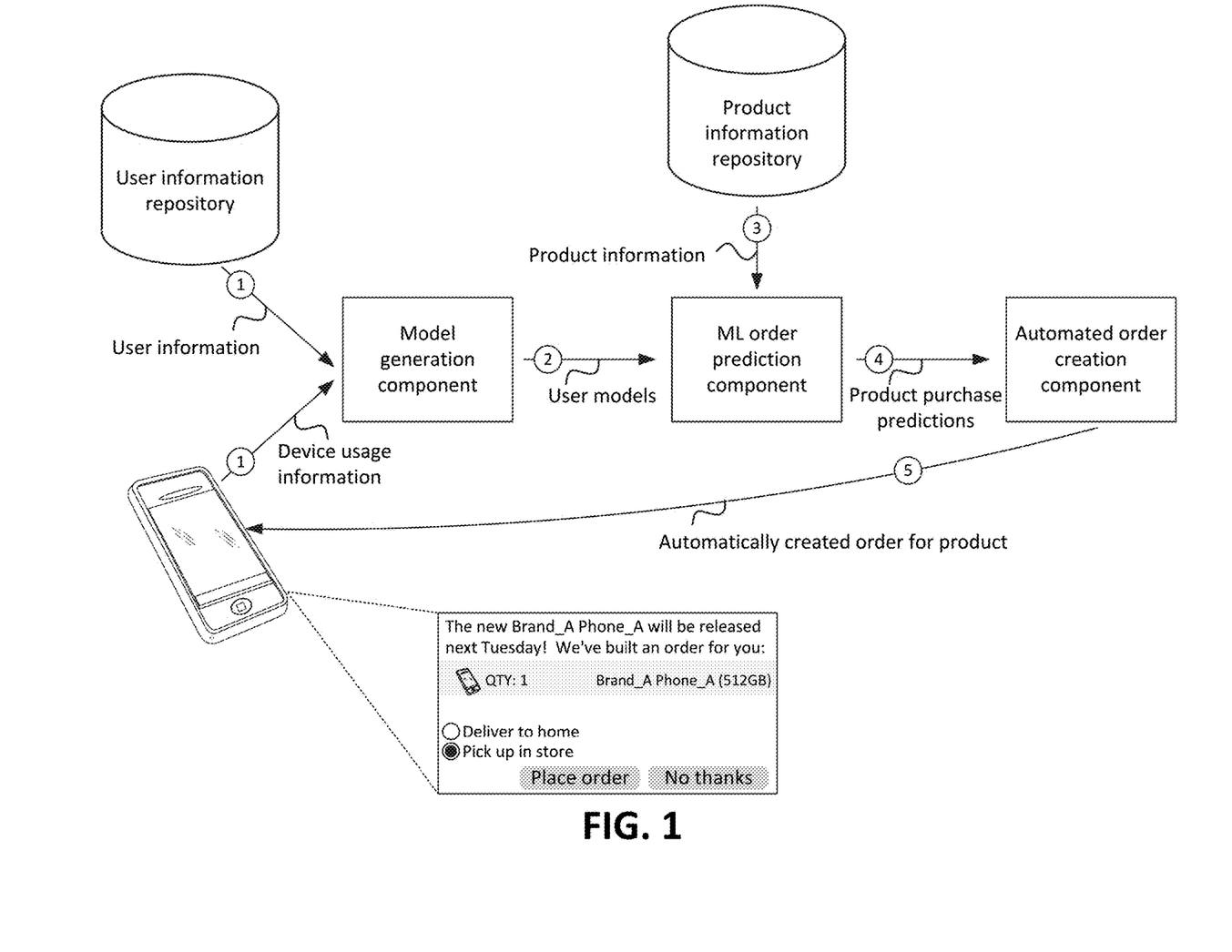
FIG. 1 illustrates an example process flow of how machine learning techniques may be applied to automatically and predictively generate an order for a product or service.

Embodiments described herein may provide for a machine learning-based system that automatically generates and presents pre-populated graphical user interfaces that allow users to place orders for products and/or services, based on machine-generated models generated for the users. For example, as shown in FIG. 1, a model generation component may receive (at 1) information regarding one or more users (e.g., from a user information repository, which, as described below, may be a device or system that is part of a wireless telecommunications network), and/or device usage information from one or more devices. The model generation component may generate user models (e.g., where one user model corresponds to one given user, one device, or a set of devices associated with a particular user). As described herein, a user model for a particular user may generally indicate attributes associated with the particular user, such as brand affinity (e.g., whether the user prefers one brand of a product over another), early purchase affinity (e.g., whether the user tends to pre-purchase or purchase products shortly after release), web browsing or social media activity (e.g., whether the user posts on social media about a particular brand, product, service, etc.), and/or other attributes.

A machine learning ("ML") order prediction component may receive (at 2) and utilize these user models, in conjunction with product information received (at 3) from a product information repository (e.g., a device or system that stores or provides information regarding products or services that are for sale or will be for sale at a future time), to predict purchases of products or services that one or more of the users may make. For instance, the ML order prediction component may determine that a particular user typically purchases phones from the brand "Brand_A," that the user typically pre-purchases phones when they are released, and that a new model of phone, "Phone_A," will be released in the near future. Based on these factors, the ML order prediction component may determine (at 4) that it is likely (e.g., may "predict") that the particular user will purchase, or would desire to purchase or pre-purchase, the Brand_A Phone_A.

An automated order creation component may, based on this prediction, automatically (e.g., without a request from the user) generate (at 5) a graphical user interface ("GUI"), that indicates that the Brand_A Phone_A is available for pre-purchase, and may further include an option to place an order for the Brand_A Phone_A. As discussed in more detail herein, the GUI may also have one or more pre-populated options, such as color, storage capacity, where to deliver or pick up the phone, etc. In this manner, a user may be presented with a GUI that pre-selects products and/or options for those products that the user is likely to have ordered at some point. The user may thus be presented with an enhanced user experience in reducing the time and effort (e.g., by reducing the number of interactions, or "clicks") in purchasing a product and/or service that he or she may be interested in. Furthermore, presenting these automatically generated orders may increase the likelihood of a given user purchasing the product, which may increase the sales potential of the product. Additionally, automatically configuring the offering for the user via machine learning reduces potential errors, reduces network clutter during times of congestion, reduces network traffic, and aides both the user and the service provider during the transaction. In some embodiments, the model generation component, ML order prediction component, and/or automated order creation component may be components of, and/or may be communicatively coupled with, a predictive purchase assistance system (e.g., predictive purchase assistance system 210) described herein.

Figure 2:
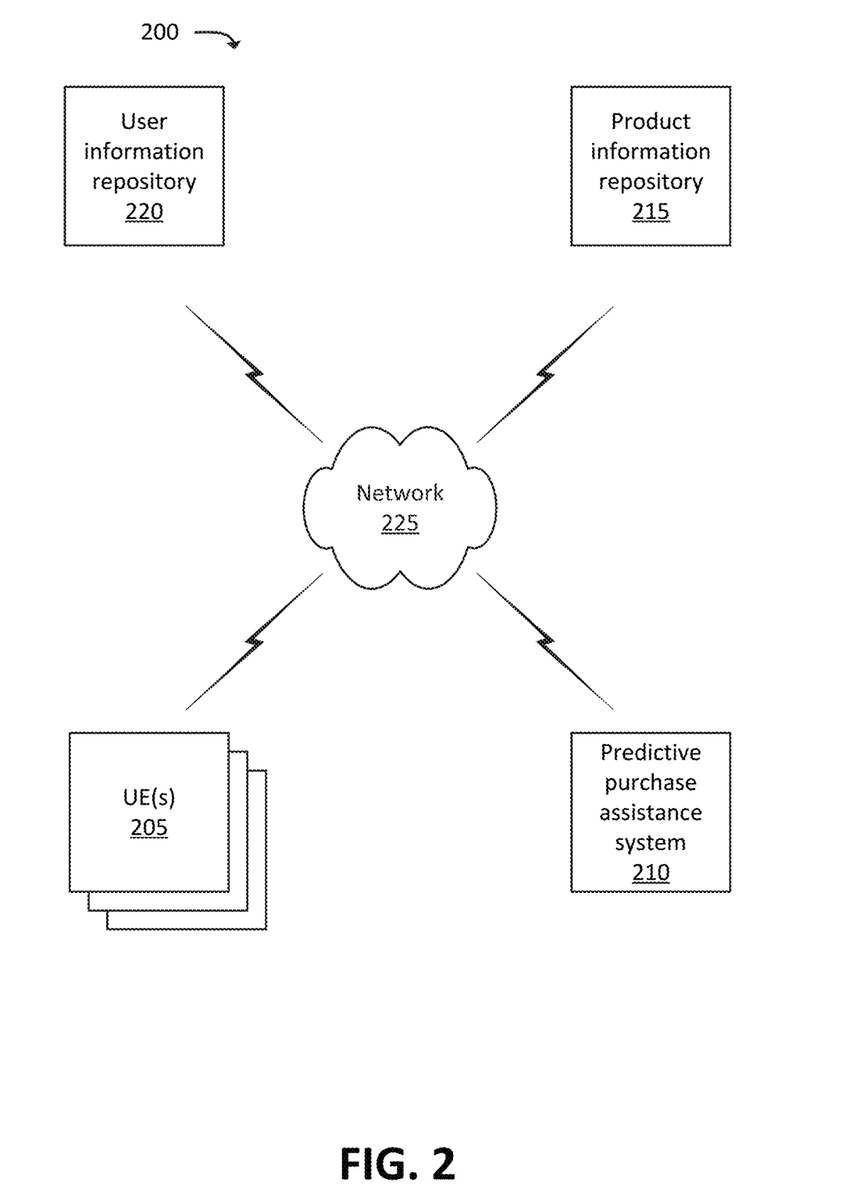
FIG. 2 illustrates an example environment in which one or more embodiments, described herein, may be implemented.

FIG. 2 illustrates an example environment 200, in which one or more embodiments, described herein, may be implemented. As shown in FIG. 2, environment 200 may include one or more user equipment ("UE") 205, predictive purchase assistance system 210, product information repository 215, user information repository 220, and network 225. The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices, systems, and/or other physical hardware that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

UE 205 may include any computation and communication device that is capable of communicating with one or more networks (e.g., network 225). For example, UE 205 may include a device that receives and/or presents content, such as web pages (e.g., that include text content and/or image content), streaming audio and/or video content, graphical user interfaces, and/or other content, via an Internet connection and/or via some other delivery technique. User device 205 may also receive user interactions via a graphical user interface (e.g., voice input, touches on a touchscreen, "clicks" via an input device such as a mouse, etc.). In some implementations, UE 205 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device (e.g., a "smart" watch, "smart" glasses, "smart" jewelry, etc.), and/or another type of computation and communication device.

Predictive purchase assistance system 210 may include one or more devices (e.g., a server device or a distributed set of devices, such as a cloud computing system) that perform one or more actions described herein. For example, predictive purchase assistance system 210 may receive (e.g., from UE 205, product information repository 215, user information repository 220, and/or from some other device or system) information regarding a user, UE 205, and/or products that are available for sale (and/or that have been available in the past, or will be available in the future). Based on this information, predictive purchase assistance system 210 may predict purchases that may be made by users, pre-populate orders (e.g., pre-populate graphical user interfaces to facilitate the predicted purchases), and provide the pre-populated orders to UEs 205 associated with the users for whom the purchases were predicted.

Product information repository 215 may include one or more devices (e.g., a server device or a distributed set of devices, such as a cloud computing system) that perform one or more actions described herein. For example, product information repository 215 may store and/or output information regarding products and services that are available (and/or that have been available in the past, or will be available in the future). Product information repository 215 may, for instance, include resources provided by a manufacturer or vendor of a product, and/or may include information obtained by programmatically accessing resources provided by a manufacturer or vendor of a product (e.g., by "web crawling" product websites).

User information repository 220 may include one or more devices (e.g., a server device or a distributed set of devices, such as a cloud computing system) that perform one or more actions described herein. For example, user information repository 220 may store and/or output information regarding one or more users or UEs 205, such as demographics information, information indicating a type of voice or data subscription associated with a user or UE 205, information regarding geographic locations at which UE 205 was located, purchasing history associated with a user and/or UE 205, social media activity associated with a user and/or UE 205, web browsing activity associated with a user and/or UE 205, and/or other suitable information. User information repository 220 may store information correlating one or more users to one or more UEs 205. For example, user information repository 220 may store a list of device identifiers (e.g., International Mobile Subscriber Identity ("IMSI") values, International Mobile Station Equipment Identity ("IMEI") values, Subscriber Identity Module ("SIM") values, Media Access Control ("MAC") addresses, etc.) that are associated with a given user.

In some embodiments, user information repository 220 may be, may include, and/or may communicatively coupled with a Home Subscriber Server ("HSS"), or similar device, of a Long-Term Evolution ("LTE") network. In some embodiments, user information repository 220 may be, may include, and/or may be communicatively coupled with a Unified Data Management ("UDM") function, or other similar function, of a Fifth Generation ("5G") network.

Network 225 may include one or more radio access networks ("RANs"), via which UEs 205 may access one or more other networks or devices, a core network of a wireless telecommunications network, an IP-based packet data network ("PDN"), a wide area network ("WAN") such as the Internet, a private enterprise network, and/or one or more other networks. In some implementations, network 225 may be, include, or be in communication with a cellular network, such as a Long-Term Evolution ("LTE") network, a Third Generation ("3G") network, a Fourth Generation ("4G") network, 5G network, a Code Division Multiple Access ("CDMA") network, etc. UE 205 may connect to, and/or otherwise communicate with, via network 225, data servers, application servers, other UEs 205, etc. Network 225 may be connected to, and/or otherwise in communication with, one or more other networks, such as a public switched telephone network ("PSTN"), a public land mobile network ("PLMN"), and/or another network.

Figure 3:
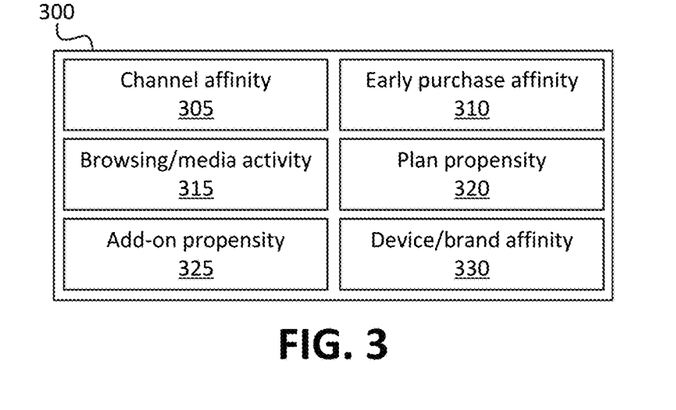
FIG. 3 illustrates an example data structure which may represent a model that may be used to describe a given user or device.

FIG. 3 conceptually illustrates example data structure 300, which may represent a particular user model. As data structure 300 represents a user model, the terms "data structure 300" and "user model 300" may be used interchangeably herein. Additionally, while the term "user model" is used herein, a particular model may not be restricted to one specific user or one specific device. For example, one "user model" may represent multiple individuals, such as a family, a department of a company, or some other group of individuals. Additionally, or alternatively, a user model may be based on information the describes, and/or is received from, multiple devices (e.g., a mobile telephone associated with a user, a tablet computer associated with the same user, a television set-top box associated with the same user, etc.).

As shown, user model 300 may include several attributes 305-330. For example, these attributes may include channel affinity 305, early purchase affinity 310, browsing/media activity 315, plan propensity 320, add-on propensity 325, and device/brand affinity 330. The attributes discussed herein are examples of attributes that can be used, however in some embodiments, model 300 may include additional, fewer, and/or different attributes. User model 300 may be generated and/or stored by predictive purchase assistance system 210, in some embodiments. In some embodiments, user model 300 may be generated, stored, and/or received by one or more other devices or systems in addition to, or in lieu of, predictive purchase assistance system 210. The information based on which user model 300 may be generated may be received from one or more sources, such as from one or more UEs 205, product information repository 215, user information repository 220, and/or one or more other systems or devices.

Figure 4:
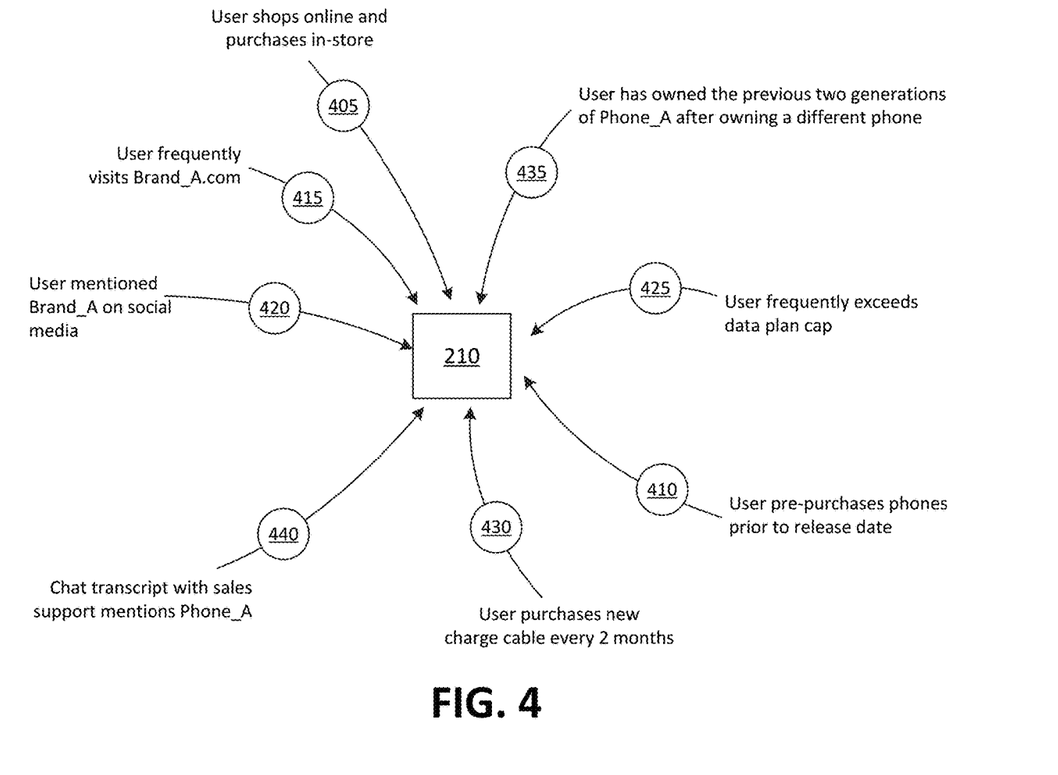
FIG. 4 conceptually illustrates example factors that may be used to generate a model that may be used to describe a given user or device.

FIG. 3 is described in conjunction with FIG. 4, which describes factors that may contribute to how attributes of user model 300 are determined. Channel affinity 305 may be an attribute that represents channels that a particular user (or group of users) has a propensity toward participating in when purchasing products or services. For example, channel affinity 305 may indicate that a user typically shops for products online (e.g., through a website or mobile application) and purchases those products online; that the user typically shops for products online and purchases those products from a physical store (and if so, whether the physical store is associated with a website that the user accessed when shopping for the products); or that the user typically shops for products in a physical store and then purchases those products online.

Referring to FIG. 4, predictive purchase assistance system 210 may receive (at 405) information indicating that the user shops online and purchases products in-store. In some embodiments, this information may be received from, and/or derived from information received from, UE 205 and/or user information repository 220. For example, UE 205 and/or user information repository 220 may include information indicating geographic locations visited by UE 205, timestamps associated with the geographic locations visited by UE 205, information indicating geographic locations of stores, businesses, etc., and/or other suitable information, based on which predictive purchase assistance system 210 may determine that UE 205 has been present at particular stores at particular times.

The information (received at 405) may further be based on information (e.g., as received or stored by UE 205 and/or user information repository 220) that indicates that a user of UE 205 (e.g., by using UE 205 or another device associated the user) has purchased a product or service online. For example, user information repository 220 may receive information indicating that the user has purchased the product or service, in situations where user information repository 220 is configured to receive such information (e.g., when user information repository 220 is a network device of a wireless telecommunications network provider that also offers the product for sale online and/or in physical stores). As another example, UE 205 may directly report (e.g., via an application programming interface ("API") or some other suitable technique) purchasing and/or geographic location information to predictive purchase assistance system 210.

Predictive purchase assistance system 210 may use machine learning techniques to generate or refine a model that indicates how to classify the channel affinity attribute 305 of users. For example, predictive purchase assistance system 210 may receive (at 405) geographic location information, online shopping information, and/or in-store shopping information for a relatively large number (e.g., thousands, hundreds of thousands, or more) of UEs 205 or users to determine whether a particular user or UE 205 can be classified as having visited a store (e.g., as opposed to merely passing by, or at a location that is near the store but not inside the store). For example, predictive purchase assistance system 210 may determine that UEs 205 that were present within the store for ten minutes or more were more likely to be associated with a user who made a purchase within the store, than UEs 205 that were present within the store for fewer than ten minutes. As another example, predictive purchase assistance system 210 may determine that a higher amount of time spent within the store is correlated with a higher incidence of making a purchase at the store.

Early purchase affinity 310 may indicate a likelihood that a particular user will pre-purchase a product or service, and/or may indicate a likelihood that a particular user will purchase the product or service within a threshold amount of time after the product is released (e.g., within the first week of release, within the first month of release, etc.). For example, predictive purchase assistance system 210 may receive (at 410) information that indicates that the particular user typically pre-purchases phones prior to their release date. For instance, predictive purchase assistance system 210 may receive information from UE 205 and/or user information repository 220 that indicates purchases placed via UE 205 (and/or by a user with which UE 205 is associated), and dates and/or times at which those purchases were made. In some embodiments, this information may indicate whether the purchase is a pre-purchase (e.g., an order for a product that is not yet available for sale). In some embodiments, predictive purchase assistance system 210 may also receive (e.g., from product information repository 215) information indicating release dates of products. Predictive purchase assistance system 210 may thus determine whether a given purchase of a product was made before or after the release date of the product. Additionally, or alternatively, predictive purchase assistance system 210 may further determine how far in advance of the release date a pre-purchase was made (e.g., one week before release, one month before release, etc.), or how far after the release date a purchase was made (e.g., one week after release, one month after release, etc.). Predictive purchase assistance system 210 may thus generate or refine the early purchase affinity attribute 310 for a particular user (or group of users) based on an analysis of when products were purchased, in relation to their release date.

Browsing/media activity 315 may indicate how much a user accesses or creates content that is associated with a particular product or service. For example, predictive purchase assistance system 210 may receive (at 415) information that indicates that the user frequently accesses Brand_A.com (where in this example, "Brand_A.com" is a website of an example manufacturer "Brand_A" of an example phone "Phone_A"). For instance, predictive purchase assistance system 210 may receive web browsing history from UE 205 and/or user information repository 220, and may use machine learning, statistical analysis, and/or some other suitable technique to classify the user or UE 205 as "frequently" visiting Brand_A.com. For example, predictive purchase assistance system 210 may determine that a quantity of times that UE 205 has accessed Brand_A.com exceeds a threshold quantity of times, and/or that an amount of time spent actively browsing Brand_A.com exceeds a threshold amount of time. Additionally, or alternatively, predictive purchase assistance system 210 may determine that the user visits "Brand_A.com" more frequently than websites for other brands. As another example, predictive purchase assistance system 210 may identify a search history that indicates that the user has searched for "Brand_A" in the past, and/or has searched for "Brand_A" more frequently than other users. In some embodiments, predictive purchase assistance system 210 may identify that the user has clicked on advertisements for Brand_A products, and/or has clicked on advertisements for Brand_A products more frequently than advertisements for products for other brands, and/or has clicked on advertisements for Brand_A products more frequently than other users have clicked on advertisements for Brand_A products.

As another example, predictive purchase assistance system 210 may compare the quantity or amount of time Brand_A.com was accessed by UE 205, to quantities or amounts of time that Brand_A.com was accessed by multiple other UEs 205. For example, assume that predictive purchase assistance system 210 receives browsing information for 1,000 UEs 205, where 100 of these UEs 205 accessed Brand_A.com during a particular time window (and 900 of these UEs 205 did not access Brand_A.com during the same time window). Of the 100 UEs 205 that accessed Brand_A.com during the particular time window, predictive purchase assistance system 210 may further determine an average quantity of times that each of the 100 UEs 205 accessed Brand_A.com, and/or an average amount of time spent by each of the 100 UEs 205 accessing Brand_A.com during the time window. Predictive purchase assistance system 210 may identify one or more of these 100 UEs 205 as "frequently" accessing Brand_A.com, such as the UEs 205 that accessed Brand_A.com the most times out of the 100 UEs 205 (e.g., the ten UEs 205 that accessed Brand_A.com the most, the top 10% of UEs that accessed Brand_A.com the most, etc.), the UEs 205 that accessed Brand_A.com at least a threshold quantity of times (e.g., the UEs 205 that accessed Brand_A.com at least ten times during the particular time window); and/or some combination of the above (e.g., up to ten UEs 205 that accessed Brand_A.com at least ten times during the particular time window).

While some examples are discussed above that describe how a particular UE 205 can be compared to other UEs 205 to determine whether the UE 205 can be classified as "frequently" accessing a web site, in practice, other suitable techniques are possible. For example, in addition to, or in lieu of, a classification of "frequently" accessing a web site, predictive purchase assistance system 210 may generate or modify a score that reflects how frequently UE 205 accesses the web site. Additionally, while examples were given above in the context of "averages," in practice, other statistical functions may be used, such as medians, minimums, maximums, etc. Furthermore, in order to identify differences between how frequently a UE 205 accesses a site compared to other UEs 205, determining outliers using standard deviations, variances, and/or other statistical techniques may be used.

Additionally, predictive purchase assistance system 210 may receive (e.g., from product information repository 215) information indicating that a particular website, Uniform Resource Locator ("URL"), social media keyword or "hashtag," and/or other term is associated with a particular product or service. For example, predictive purchase assistance system 210 may receive information indicating that the domain name "Brand_A.com" is associated with the company Brand_A, that the URL "Brand_A.com/Phone_A" is a product page associated with the Brand_A Phone_A, that the social media keyword "#Phone_A" is associated with the Brand_A Phone_A, etc. In this manner, predictive purchase assistance system 210 may determine that a UE 205 that frequently accesses Brand_A.com is likely to be associated with a user who is interested in Brand_A products.

For example, predictive purchase assistance system 210 may receive (at 420) information that indicates that the user has mentioned #Phone_A on social media. For example, predictive purchase assistance system 210 may receive (e.g., from UE 205 and/or user information repository 220) public identifying information for a social media account associated with the user, and may identify content generated by (e.g., "posts" or "comments") the user via the social media account.

Plan propensity 320 may indicate attributes or types of plans (e.g., voice plans, data plans, etc.) typically subscribed to by a user. For example, predictive purchase assistance system 210 may receive (e.g., from UE 205 and/or user information repository 220) information indicating terms of plans (e.g., month-to-month, one-year plan, two-year plan, etc.), levels of service of plans (e.g., maximum data usage per month, maximum voice minutes per month, data speeds, quality of service ("QoS") levels, etc.), as well as other relevant information such as amount of usage (e.g., voice minutes used in a given period of time, amount of data used in a given period of time, etc.). Based on these attributes, predictive purchase assistance system 210 may classify or score the user to generate or modify a plan propensity 320 of the user.

For example, predictive purchase assistance system 210 may receive (at 425) information indicating that a particular user currently subscribes to a capped data plan (e.g., has a threshold amount of data usage per a given time period) and frequently exceeds the data cap. As similarly discussed above, the classification of the user "frequently" exceeding the data cap may be on dynamic or static thresholds, and/or may be based on a comparison of the usage of a particular user or UE 205 against usage of multiple users or UEs 205.

Add-on propensity 325 may indicate how likely a user is to purchase accessories or add-ons for a particular product or service. Accessories or add-ons may, in some embodiments, be determined based on an analysis of names of products (e.g., a product named "Charger for Phone_A" may be determined to be an accessory for Phone_A, based on the phrase "for Phone_A"). In some embodiments, machine learning techniques may be used to identify accessories or add-ons. For example, predictive purchase assistance system 210 (and/or some other device or system) may identify (e.g., based on information received from UEs 205 and/or user information repository 220) that a first product was often purchased at the same time as a second product (e.g., at least a threshold quantity or proportion of purchases of the first product were made at the same time as purchases of the second product), and/or that owners of the first product often purchased the second product, while individuals who do not own the first product purchase the second product less frequently than owners of the first product.

In some embodiments, add-on propensity 325 may additionally, or alternatively, be based on how often a particular user purchases add-ons or accessories. For example, predictive purchase assistance system 210 may receive (at 430) information (e.g., from UE 205 and/or user information repository 220) that a user associated with UE 205 purchases a phone charging cable every two months. This may indicate that the user has a higher add-on propensity 325 than a user who purchases a phone charging cable, for example, every twelve months.

Device/brand affinity 330 may indicate how much a particular device or brand is likely to be purchased by a given user, as opposed to other devices or brands. Device/brand affinity 330 may be based on information received from UE 205, product information repository 215, and/or user information repository 220. For instance, Predictive purchase assistance system 210 may analyze multiple different types of information (e.g., social media information, purchasing information, geographic location information of UE 205 (e.g., whether UE 205 visited a store that is owned by, or sells products from, a particular brand), web browsing history, chat transcripts between UE 205 and a sales support call center, and/or other types of information) in order to determine how much the user prefers a particular device or brand over other devices or brands.

Predictive purchase assistance system 210 may use machine learning and/or other types of techniques in order to generate or modify device/brand affinity 330 for a given user. For instance, predictive purchase assistance system 210 may determine (or receive information indicating) that the phrase "I love" indicates a positive intent of a user, while predictive purchase assistance system 210 may determine (or receive information indicating) that the phrase "I hate" indicates a negative intent of a user. Thus, for example, in some situations, while predictive purchase assistance system 210 may receive (at 420) information indicating that a user mentioned "Brand_A" on social media, predictive purchase assistance system 210 may further analyze the user's social media account to determine that the mention of "Brand_A" was in the sentence, "I hate Brand_A." In this scenario, predictive purchase assistance system 210 may generate or modify device/brand affinity 330 to indicate that the user may not be likely to purchase an Brand_A product. On the other hand, if the user's social media included the phrase "I love Brand_A," predictive purchase assistance system 210 may generate or modify device/brand affinity 330 to indicate that the user may be likely to purchase an Brand_A product (and/or favors Brand_A products over products of other brands).

As another example, predictive purchase assistance system 210 may receive (at 435) information indicating past purchases of the user, and may determine that the user has owned the past two generations of Phone_A. Predictive purchase assistance system 210 may additionally, in some embodiments, receive information (e.g., from product information repository 215) that includes product information for the various generations of Phone_A, such as names, stocking units ("SKUs"), etc. Predictive purchase assistance system 210 may also, in some embodiments, receive information that indicates product information for other related products (e.g., other phones). Based on this information, predictive purchase assistance system 210 may not only determine that the user has owned the previous two generations of Phone_A, it may further be inferred that the user opted to purchase the previous two generations of Phone_A instead of other products that were available from other brands. In this situation, predictive purchase assistance system 210 may determine that the user favors Brand_A (and/or the Phone_A) over other brands (and/or products).

As yet another example, predictive purchase assistance system 210 may receive (at 440), a chat transcript or call log from a sales support center (e.g., a transcript of a text-based chat or a voice-based chat). The chat transcript or call log may indicate that the user mentioned Phone_A while chatting with the sales support center. Based on this mention, predictive purchase assistance system 210 may increase a score, for device/brand affinity 330, associated with the user (e.g., increase the score for Brand_A or for Phone_A in relation to an affinity score for another brand or product).

In some embodiments, the temporal proximity of the chat or call to the release data of a product may also be reflected in the device/brand affinity attribute 330. For example, if the user contacts the sales support center within a threshold period of time (e.g., seven days) of release of a product, this may indicate that the user is relatively interested in the product, and predictive purchase assistance system 210 may increase the score, for device/brand affinity 330, based on this contact. In some embodiments, the threshold may be adjusted or refined using machine learning or other techniques. For instance, predictive purchase assistance system 210 may identify a relatively large quantity of chats or calls, that mention a particular product) to a sales support center within ten days of release of the product, but that the users who made the calls 8-10 days prior to the release did not purchase the product with any significantly greater frequency or incidence than users who did not make calls to sales support. Predictive purchase assistance system 210 may further, for example, identify that users who made calls 1-7 days prior to the release (and also mentioned the product) purchased the product with significantly greater frequency or incidence than users who did not make calls to sales support (or who made calls 8-10 days before release), and may thus determine that seven days is the threshold. Predictive purchase assistance system 210 may continue to refine the threshold over time based on correlating such chats and calls to actual purchases of products.

Figure 5:
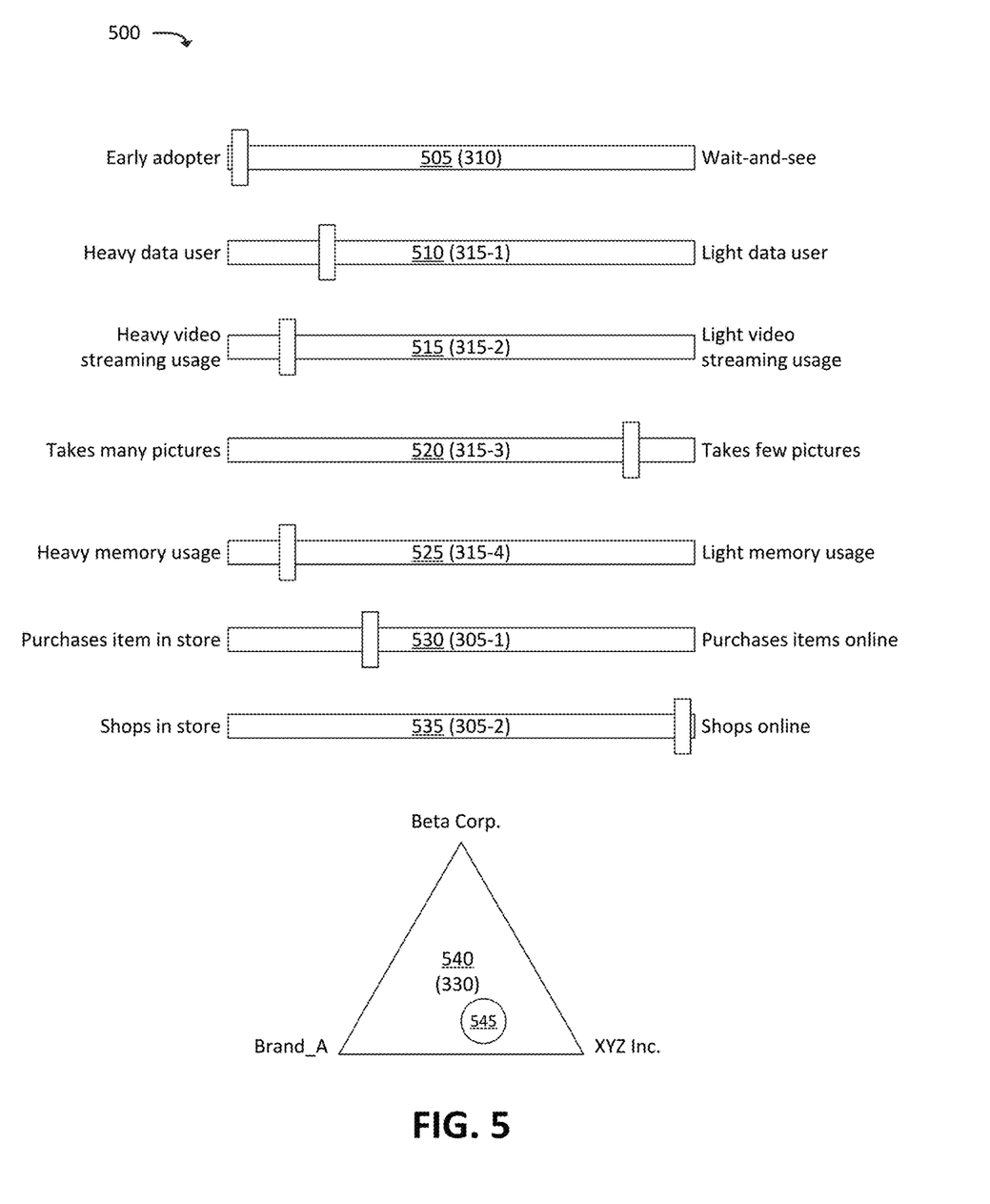
FIG. 5 conceptually illustrates an example of how a model may represent attributes of a given user or device.

FIG. 5 illustrates an example representation 500 of attributes of a particular user model 300. As shown here, attributes of user model 300 may be conceptually represented by one axis (e.g., by sliders), by two axes (e.g., by a triangle or other shape), and/or in some other suitable way.

For example, as shown, a first slider 505 may represent early purchase affinity 310. In this example, the user with which user model 300 is associated may be a classified as an early adopter, based on purchase history (e.g., as discussed above, the user may pre-purchase products and/or purchase products soon after release). Slider 505 shown here may include the classifications "early adopter" and "wait-and-see," which may be automatically generated and/or may be manually defined. For example, one or more machine learning techniques may be used to determine that the phrase "early adopter" is indicative of individuals who pre-purchase products or purchase them soon after release, based on an analysis of natural language resources (e.g., transcripts of natural language conversations), based on reinforced learning (e.g., in which a user may indicate that he or she is an "early adopter" or that he or she would rather "wait and see" before purchasing), based on correlating purchasing patterns of individuals with whom these phrases are associated, etc.

As further shown, a second slider 510 may represent browsing/media activity 315-1. As used herein, different sliders may represent portions of a particular attribute, and these portions are represented here as sliders 510-525, which represent portions 315-1 through 315-4, respectively, of a browsing/media activity attribute 315. As shown, the example user may be a relatively heavy data user, as opposed to a light data user (e.g., based on an amount of usage of a data plan of the user, as discussed above). As another example, the user may be a relatively heavy user of video streaming services, as opposed to a light user of video streaming services. Predictive purchase assistance system 210 may, in some embodiments, determine that the user is a relatively heavy user of video streaming services based on, for instance, comparing information regarding streaming usage of UE 205 (e.g., as received from UE 205 and/or user information repository 220) to information regarding streaming usage of one or more other UEs 205.

Representation 500 may include slider 520 for browsing/media activity 315-3 (e.g., a indication of how many pictures the user takes), slider 525 for browsing/media activity 315-4 (e.g., how much storage capacity of UE 205, associated with the user, is used), slider 530 for channel affinity 305-1 (e.g., whether the user tends to purchase items in a physical store or online), and slider 535 for channel affinity 305-2 (e.g., whether the user tends to shop online or shop in a physical store). In this example, representation 500 also includes, in lieu of a slider, triangle 540 to represent device/brand affinity 330. This example reflects the user's propensity towards three example brands: Brand_A, Beta Corp., and XYZ Inc. As indicated by circle 545, the user may tend to prefer Brand_A over Beta Corp. (e.g., as indicated by circle 545 being closer to the corner representing a preference for Brand_A), and may prefer XYZ Inc. over Beta Corp. (e.g., as indicated by circle 545 being closer to the corner representing a preference for XYZ Inc.). However, this representation may indicate that the user prefers XYZ Inc. over Brand_A, by virtue of circle 545 being closer to the corner representing a preference for XYZ Inc.

In some embodiments, predictive purchase assistance system 210 may generate a report (e.g., a GUI) that includes some or all of representation 500. For example, an administrator associated with predictive purchase assistance system 210 may indicate a request for a report representing a model 300 for a particular user, group of users, UE 205, or group of UEs 205. Predictive purchase assistance system 210 may receive the request for the report, and populate a GUI with a report that includes graphical elements that represent model 300 (e.g., similar to representation 500).

Figure 6:
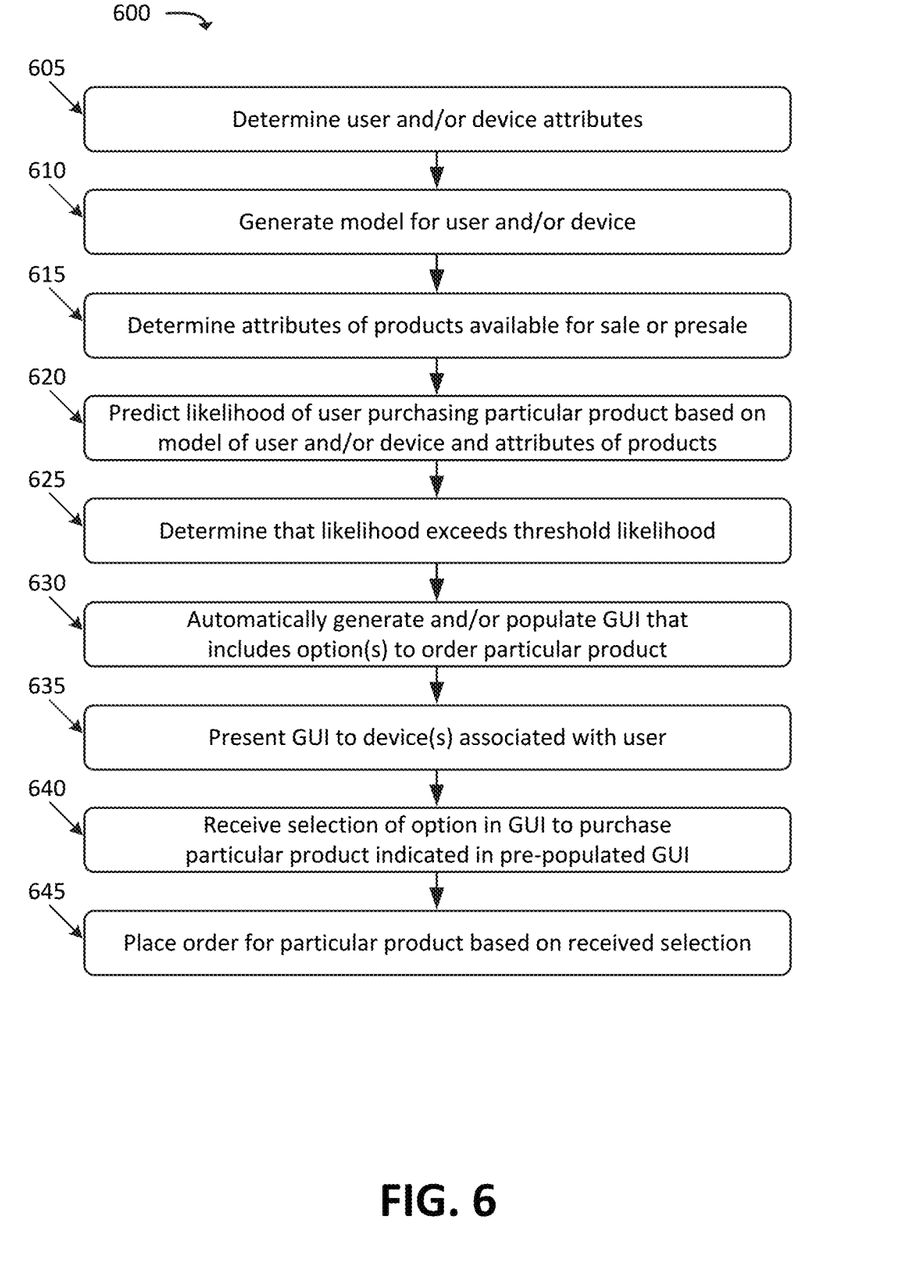
FIG. 6 illustrates an example process for automatically and predictively generating an order for a product or service.

FIG. 6 illustrates example process 600 for automatically and predictively generating an order for a product or service. In some embodiments, some or all of process 600 may be performed by predictive purchase assistance system 210 and/or one or more other devices (e.g., UE 205, product information repository 215, user information repository 220, and/or another device or system).

Process 600 may include determining (at 605) attributes of a user and/or device. For instance, predictive purchase assistance system 210 may receive (e.g., from UE 205 and/or user information repository 220) attributes of a user of UE 205, and/or of UE 205 itself. For example, as discussed above, predictive purchase assistance system 210 may receive demographics information of the user, a purchase history associated with the user, an identification of a make and/or model of one or more devices that are associated with the user (e.g., devices that have been provisioned or authorized for use with a wireless telecommunications network), types of data plans subscribed to by the user, a web browsing history of the user, a content accessing history of the user (e.g., identification of streaming video or audio content accessed by the user), battery usage of UE 205, memory usage of UE 205, and/or other types of information regarding the user or UE 205.

Process 600 may also include generating (at 610) a model for the user and/or device. For example, as described above with respect to FIGS. 3-5, predictive purchase assistance system 210 may generate a model for the user and/or UE 205 based on the information (received at 605). Predictive purchase assistance system 210 may continue to receive (at 605) ongoing information and may continue to refine (at 610) the model for the user. For example, over the span of months or years, the user's affinity toward a certain brand may change. For instance, assume that in a first year, the user purchased a phone from Beta Corp. but in the two subsequent years, the user purchased phones from Brand_A (and not from Beta Corp.). As of the first year, the model for the user (e.g., as generated by predictive purchase assistance system 210) may include a device/brand affinity attribute 330 that indicates that the user prefers Beta Corp. products over Brand_A products. In the subsequent years, predictive purchase assistance system 210 may modify the device/brand affinity attribute 330 of the user's model to reflect that the user prefers Brand_A products over Beta Corp. products.

For example, predictive purchase assistance system 210 may modify a score (e.g., as conceptually represented by a slider or a triangle graph in FIG. 5) for the device/brand affinity attribute 330 of the user's model by increasing a score for Brand_A, and/or by decreasing a score for Beta Corp.

Process 600 may further include determining (at 615) attributes of products available for sale or presale. For example, predictive purchase assistance system 210 may receive (e.g., from product information repository 215) information describing attributes of products that are available for sale, or will be available for sale (e.g., products available for presale). The attributes of the products may include, for example, brand, model name, memory capacity, screen size, screen resolution, screen type (e.g., Liquid Crystal Display ("LCD"), Light Emitting Diode ("LED"), organic LED ("OLED"), etc.), number of cameras, camera resolution (e.g., as expressed in megapixels), suggested retail price, supported radio access technologies ("RATs"), and/or other attributes.

Process 600 may additionally include predicting (at 620) a likelihood of the user purchasing a particular product based on the model of the user and/or the device and the attributes of products available for sale or presale. For example, predictive purchase assistance system 210 may compare attributes of the user model (generated at 610) to attributes of a particular product (determined at 615) in order to determine a likelihood of the user purchasing the product. Predictive purchase assistance system 210 may, for instance, generate a score that reflects the likelihood. Referring, for instance, to the attributes shown in FIG. 5, predictive purchase assistance system 210 may increase a score for a product that has just been released (e.g., within the past week or month), and/or has not yet been released, based on the fact that the user has been classified as an "early adopter." Similarly, predictive purchase assistance system 210 may decrease a score for a product that has been available for a relatively long period of time (e.g., six months or more, where a longer time that the product has been available may cause the score for the product to be decreased further).

As another example, predictive purchase assistance system 210 may increase a score for a product has a relatively large memory capacity (e.g., in relation to other products that are available, and/or in relation to other products that are made available for sale within a threshold amount of time that the particular product is made available for sale, such as products that have been released in the same month as the particular product), based on the classification that the user is associated with "heavy memory usage." Similarly, predictive purchase assistance system 210 may decrease a score for a product that has a relatively low memory capacity, as the user may not be interested in products with low memory capacities.

As yet another example, predictive purchase assistance system 210 may increase a score for a product that includes a relatively low-performing camera (e.g., a low camera resolution compared to cameras of other available products, and/or fewer cameras than other available products), based on the determination that the user takes relatively few pictures. It may be beneficial to increase the score for such products because even though they have lower capabilities than products with better performing cameras, the user may not be interested in paying extra for the products with better performing cameras.

Process 600 may further include determining (at 625) that the likelihood exceeds a threshold likelihood. For example, assuming that the likelihood (determined at 620) that the user will purchase the particular product is represented as a score, predictive purchase assistance system 210 may determine whether this score exceeds a threshold score. In some embodiments, this score may be a static threshold, such as 75 on a normalized scale from 1-100. As discussed below, this score may be dynamically adjusted in some embodiments.

Figure 7:
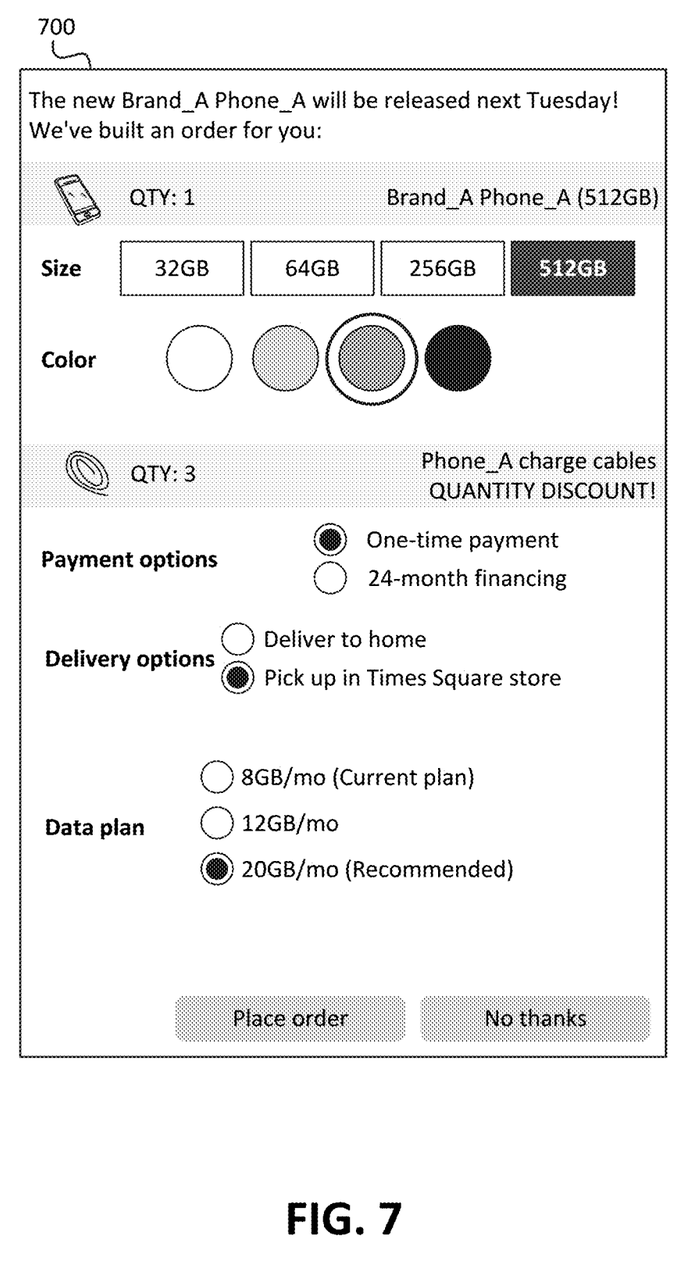
FIG. 7 illustrates an example graphical user interface that may be automatically generated, in which an order may be pre-populated based on a user model.

Process 600 may also include automatically generating and/or populating a GUI that includes options (at 630) to order the particular product. For example, referring to FIG. 7, predictive purchase assistance system 210 may generate a GUI 700 that includes options to purchase the particular product. In this example, the particular product is the Brand_A Phone_A with a 512 GB capacity and a dark gray color. As also shown in FIG. 7, this product is a prerelease product ("will be released next Tuesday!"). These attributes (e.g., color and capacity) may have been determined (at 620) based on a comparison of the user model and the attributes of the available product. For example, predictive purchase assistance system 210 may have determined that the user has an affinity towards Brand_A products and/or the Phone_A in particular based on past purchase history, social media activity, browsing activity, etc. Predictive purchase assistance system 210 may also have determined that the user has typically purchased dark gray phones in the past, and/or that the user does not prefer white, light gray, or black phones (e.g., where the other options shown in FIG. 7 are white, light gray, and black). Based on this determination, predictive purchase assistance system 210 may pre-select the option in the GUI for dark gray (as denoted by the bold circle around the dark gray circular swatch in GUI 700), in lieu of pre-selecting the options for white, light gray, or black. This option may be "pre-selected" in that, prior to presentation to the user (e.g., via UE 205 associated with the user), this option may be selected such that the user does not need to perform any action (e.g., tap a touchscreen or click a mouse) to make this selection.

In some embodiments, GUI 700 may represent, and/or may be associated with a "cart" for a particular user. For example, when generating GUI 700, predictive purchase assistance system 210 may place the selected products and/or services in a "cart," which may be part of an ordering process. For example, the "cart" may include items that were selected by the user (e.g., "added to the cart" by the user) in addition to, or in some instances in lieu of, the products and/or services added by predictive purchase assistance system 210. By adding the products and/or services to the cart, the process of making the purchase may require fewer interactions, or "clicks" (e.g., by eliminating the need for the user to place the items in the cart) from the user, thus increasing the likelihood of the user purchasing the items.

Predictive purchase assistance system 210 may have also determined (e.g., at 610 and/or 620) that the user's devices typically use a relatively large amount of storage capacity (e.g., in relation to other users or devices), and may thus pre-select the largest available data capacity (512 GB in this example). This data capacity may be selected in lieu of the other options (32 GB, 64 GB, and 256 GB, in this example).

Predictive purchase assistance system 210 may have also determined that the user has propensity to purchase a relatively high quantity of charge cables (e.g., in relation to other users), and may add charge cables to the order. Predictive purchase assistance system 210 may, for instance, select a quantity in accordance with how many charge cables the user purchased in the last year, and/or may select a quantity that is likely to be accepted by the user. For example, predictive purchase assistance system 210 may use machine learning and/or other techniques to determine quantities of charge cables that were purchased by similar users (e.g., where models of "similar users" share one or more attributes with the model for the particular user) and may determine the quantity of charge cables to add to the order based on the determined quantities of charge cables that were purchased by similar users.

Predictive purchase assistance system 210 may have determined that the user has a propensity to purchase products that are indicated as a "deal" or "discount" (e.g., based on past purchasing history associated with the user). Predictive purchase assistance system 210 may thus indicate (e.g., "QUANTITY DISCOUNT!") in the GUI that the charge cables are being offered at a discounted rate.

Predictive purchase assistance system 210 may also pre-select, in GUI 700, a delivery option (e.g., deliver the product to the user's home, or pick up in a particular store). This option may be pre-selected based on, for example, the channel affinity attribute 305 of the user's model. Additionally, predictive purchase assistance system 210 may pre-select a data plan (e.g., based on the plan propensity attribute 320 of the user's model).

Process 600 may additionally include presenting (at 635) the GUI to one or more devices associated with the user. For example, predictive purchase assistance system 210 may deliver the GUI via a "pop-up" notification, an email, a URL, a Short Messaging Service ("SMS") message, and/or via some other suitable technique to one or more UEs 205 associated with the user. For example, predictive purchase assistance system 210 may receive (e.g., at 605) an indication of a particular UE 205 (or set of UEs 205) that are associated with the user, and/or are currently being used by the user, and select one or more of these UEs 205 to deliver the GUI to. For instance, in some embodiments, predictive purchase assistance system 210 may present the GUI to a UE 205 that the user is currently using.

In some embodiments, predictive purchase assistance system 210 may determine a time and/or location at which the user is most likely to place an order via the GUI. For instance, predictive purchase assistance system 210 may receive or determine information indicating a time of day and/or day of week that the user typically purchases products (e.g., based on a purchase history associated with the user), and present the GUI in accordance with the determined time(s) and/or day(s). For example, assume that the user typically purchases products via UE 205 between the hours of 8:00 AM-9:15 AM during weekdays. Further assume that predictive purchase assistance system 210 determines that UE 205 is frequently located at a set of geographic locations that correspond to a commuter rail system during these hours. In this situation, it may be inferred that the user is commuting to work (e.g., by virtue of traveling along a commuter rail system during weekday mornings), and purchases products while commuting. In this example, predictive purchase assistance system 210 may present the pre-populated order GUI 700 to UE 205 during this time. In some embodiments, predictive purchase assistance system 210 may wait to present the pre-populated order GUI 700 until such time as the user is likely to place the order. For example, even if predictive purchase assistance system 210 makes a determination on Sunday evening that the user is likely to be interested in purchasing the Brand_A Phone_A, predictive purchase assistance system 210 may forgo presenting GUI 700 to UE 205 until Monday morning at 8:00 AM. In some embodiments, predictive purchase assistance system 210 may present GUI 700 to UE 205, with instructions indicating a day and/or time at which to present GUI 700 (i.e., at Monday morning at 8:00 AM, in this example).

In some embodiments, the threshold (evaluated at 625) may be set and/or adjusted using machine learning techniques. For example, predictive purchase assistance system 210 may receive feedback when presenting pre-populated order GUIs (e.g., in accordance with block 635), where the feedback may include a user placing an order through the GUI, dismissing the GUI without placing an order, placing an order for the suggested product via other channels (e.g., without using the GUI), a response to a survey (e.g., where the user affirmatively indicates that the GUI was or was not helpful), etc. Predictive purchase assistance system 210 may adjust the threshold based on such feedback. For instance, if the threshold is too low, then a relatively large number of disinterested users may receive the GUI without placing an order for the suggested product, which may result in a degraded, "spammy" user experience. On the other hand, if the threshold is too high, then users who may have been interested in placing an order for the particular product may not be provided with the opportunity to place an order through the GUI.

Process 600 may further include receiving (at 640) a selection of an option, in the GUI, to purchase the particular product. For example, predictive purchase assistance system 210 (and/or another device or system) may receive an indication that the selectable option (e.g., a "place order" button) was selected. Since the particular product was pre-populated in the GUI, selection of the selectable option may indicate that the user wishes to purchase the particular product. Thus, process 600 may include placing (at 645) the order for the particular product based on receiving the selection of the selectable option.

Figure 8:
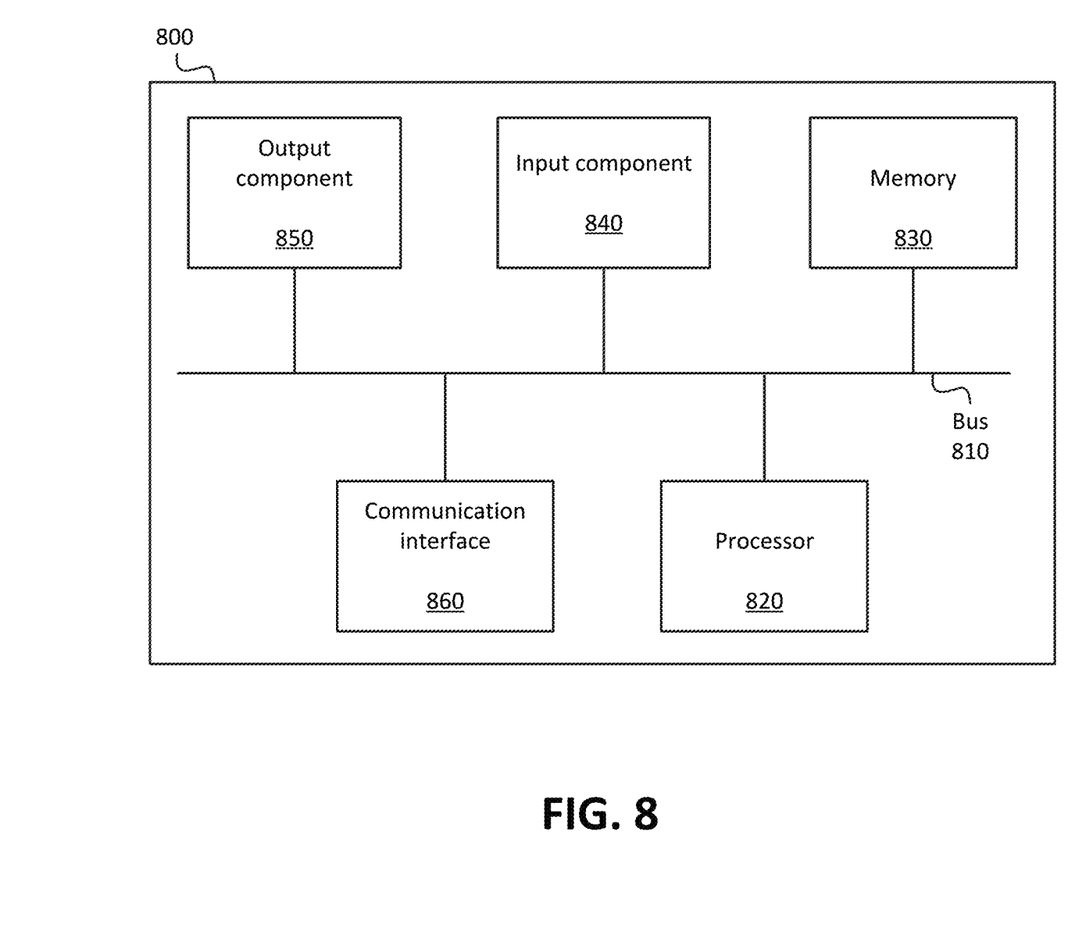
FIG. 8 illustrates example components of one or more devices, according to one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while a series of blocks and/or signals has been described with regard to FIG. 6, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    a non-transitory computer-readable medium storing a set of processor-executable instructions; and
    one or more processors configured to execute the set of processor-executable instructions, wherein executing the set of processor-executable instructions causes the one or more processors to:
        determine one or more attributes of a user of a particular user equipment ("UE");
        compare the one or more attributes, of the user, to attributes of a plurality of other users;
        generate a model for the user based on the comparing of the one or more attributes, of the user, to the attributes of the plurality of other users;
        determine one or more attributes of a first product that is available for purchase;
        determine, based on the generated model and based on the one or more attributes of the first product, a time period during which a likelihood that the user will purchase the first product exceeds a threshold likelihood;
        identify, based on the model and further based on determining that the likelihood that the user will purchase the first product exceeds the threshold likelihood, a second product associated with the first product;
        based on determining that the likelihood that the user will purchase the first product exceeds the threshold likelihood and further based on identifying the second product, associate the first product and the second product with a cart associated with the user;
        automatically present, during the particular time period and based on associating the first and second products with the cart associated with the user, a pre-populated graphical user interface ("GUI") to the UE associated with the user, wherein the GUI is pre-populated with:
            a plurality of options associated with a particular attribute of the first product, wherein the pre-populated GUI includes a selection of a particular option of the plurality of options associated with the particular attribute of the first product,
            an indication of the second product, and
            a selectable option to place an order for the first and second products associated with the cart,
            wherein presenting the pre-populated GUI to the UE causes the UE to display the pre-populated GUI;
        receive an indication that the selectable option in the GUI was selected; and
        place the order for the first and second products, including the particular attribute of the first product, on behalf of the user, based on the indication that the selectable option in the GUI was selected and based on the selection of the selected particular option associated with the particular attribute of the first product.

2. The device of claim 1, wherein the threshold likelihood is determined using one or more machine learning techniques.

3. The device of claim 2, wherein executing the set of processor-executable instructions, to determine the threshold likelihood using one or more machine learning techniques, further causes the one or more processors to:
    determine, for a plurality of users, a plurality of corresponding scores, wherein a particular score for a particular user, of the plurality of users, represents a likelihood that the particular user will purchase a particular product;
    determine which users, of the plurality of users, purchased the particular product;
    compare the scores, for the users who did not purchase the product, to the scores for the users who purchased the product; and
    determine or adjust the threshold likelihood based on the comparison of the scores, for the users who did not purchase the product, to the scores for the users who purchased the product.

4. The device of claim 1, wherein the one or more attributes of the user include mentions of a make or model, of the product, on a social media account associated with the user.

5. The device of claim 1, wherein executing the processor-executable instructions, to generate the model, further causes the one or more processors to:
    identify classifications associated with one or more of the other users; and
    classify the user with a same classification as another user that shares at least one attribute with the user.

6. The device of claim 1, wherein the product includes a mobile phone, wherein the particular attribute of the product includes at least one of:
   a storage capacity of the mobile phone, or
   a color of the mobile phone.

7. A non-transitory computer-readable medium, storing a set of processor-executable instructions, which, when executed by one or more processors, cause the one or more processors to:
   determine one or more attributes of a user of a particular user equipment ("UE");
   compare the one or more attributes, of the user, to attributes of a plurality of other users;
   generate a model for the user based on the comparing of the one or more attributes, of the user, to the attributes of the plurality of other users;
   determine one or more attributes of a first product that is available for purchase;
   determine, based on the generated model and based on the one or more attributes of the first product, a time period during which a likelihood that the user will purchase the first product exceeds a threshold likelihood;
   identify, based on the model and further based on determining that the likelihood that the user will purchase the first product exceeds the threshold likelihood, a second product associated with the first product;
   based on determining that the likelihood that the user will purchase the first product exceeds the threshold likelihood and further based on identifying the second product, associate the first product and the second product with a cart associated with the user;
   automatically present, during the particular time period and based on associating the first and second products with the cart associated with the user, a pre-populated graphical user interface ("GUI") to the UE associated with the user, wherein the GUI is pre-populated with:
      a plurality of options associated with a particular attribute of the first product, wherein the pre-populated GUI includes a selection of a particular option of the plurality of options associated with the particular attribute of the first product,
      an indication of the second product, and
      a selectable option to place an order for the first and second products associated with the cart,
      wherein presenting the pre-populated GUI to the UE causes the UE to display the pre-populated GUI;
   receive an indication that the selectable option in the GUI was selected; and
   place the order for the first and second products, including the particular attribute of the first product, on behalf of the user, based on the indication that the selectable option in the GUI was selected and based on the selection of the selected particular option associated with the particular attribute of the first product.

8. The non-transitory computer-readable medium of claim 7, wherein the threshold likelihood is determined using one or more machine learning techniques.

9. The non-transitory computer-readable medium of claim 8, wherein the processor-executable instructions, to determine the threshold likelihood using one or more machine learning techniques, further include processor-executable instructions to:
   determine, for a plurality of users, a plurality of corresponding scores, wherein a particular score for a particular user, of the plurality of users, represents a likelihood that the particular user will purchase a particular product;
   determine which users, of the plurality of users, purchased the particular product;
   compare the scores, for the users who did not purchase the product, to the scores for the users who purchased the product; and
   determine or adjust the threshold likelihood based on the comparison of the scores, for the users who did not purchase the product, to the scores for the users who purchased the product.

10. The non-transitory computer-readable medium of claim 7, wherein the one or more attributes of the user include mentions of a make or model, of the product, on a social media account associated with the user.

11. The non-transitory computer-readable medium of claim 7, wherein the processor-executable instructions, to generate the model, further include processor-executable instructions to:
   identify classifications associated with one or more of the other users; and
   classify the user with a same classification as another user that shares at least one attribute with the user.

12. The non-transitory computer-readable medium of claim 7, wherein the product includes a mobile phone, wherein the particular attribute of the product includes at least one of:
   a storage capacity of the mobile phone, or
   a color of the mobile phone.

13. A method, comprising:
   determining one or more attributes of a user of a particular user equipment ("UE");
   comparing the one or more attributes, of the user, to attributes of a plurality of other users;
   generating a model for the user based on the comparing of the one or more attributes, of the user, to the attributes of the plurality of other users;
   determining one or more attributes of a first product that is available for purchase;
   determining, based on the generated model and based on the one or more attributes of the first product, a time period during which a likelihood that the user will purchase the first product exceeds a threshold likelihood;
   identifying, based on the model and further based on determining that the likelihood that the user will purchase the first product exceeds the threshold likelihood, a second product associated with the first product;
   based on determining that the likelihood that the user will purchase the first product exceeds the threshold likelihood and further based on identifying the second product, associating the first product and the second product with a cart associated with the user;
   automatically presenting, during the particular time period and based on associating the first and second products with the cart associated with the user, a pre-populated graphical user interface ("GUI"), to the UE associated with the user, wherein the GUI is pre-populated with:
      a plurality of options associated with a particular attribute of the first product, wherein the pre-populated GUI includes a selection of a particular option of the plurality of options associated with the particular attribute of the first product,
      an indication of the second product, and
      a selectable option to place an order for the first and second products associated with the cart,
      wherein presenting the pre-populated GUI to the UE causes the UE to display the pre-populated GUI;

receiving an indication that the selectable option in the GUI was selected; and placing the order for the first and second products, including the particular attribute of the first product, on behalf of the user, based on the indication that the selectable option in the GUI was selected and based on the selection of the selected particular option associated with the particular attribute of the product.

14. The method of claim 13, wherein the threshold likelihood is determined using one or more machine learning techniques.

15. The method of claim 14, wherein determining the threshold likelihood using one or more machine learning techniques includes:

determining, for a plurality of users, a plurality of corresponding scores, wherein a particular score for a particular user, of the plurality of users, represents a likelihood that the particular user will purchase a particular product;

determining which users, of the plurality of users, purchased the particular product;

compare the scores, for the users who did not purchase the product, to the scores for the users who purchased the product; and determining or adjust the threshold likelihood based on the comparison of the scores, for the users who did not purchase the product, to the scores for the users who purchased the product.

16. The method of claim 13, wherein the one or more attributes of the user include mentions of a make or model, of the product, on a social media account associated with the user.

17. The method of claim 13, wherein generating the model further includes:

identifying classifications associated with one or more of the other users; and classifying the user with a same classification as another user that shares at least one attribute with the user.

18. The method of claim 13, wherein the product includes a mobile phone, wherein the particular attribute of the product includes at least one of:

a storage capacity of the mobile phone, or a color of the mobile phone.

* * * * *